United States Patent
Reddan et al.

(10) Patent No.: US 11,388,205 B2
(45) Date of Patent: Jul. 12, 2022

(54) SYSTEMS AND METHODS FOR ESTABLISHING A SHARED AUGMENTED REALITY SESSION

(71) Applicant: EIDOS INTERACTIVE CORP., Montreal (CA)

(72) Inventors: Anthony Reddan, Montreal (CA); Renaud Bedard, Montreal (CA)

(73) Assignee: EIDOS INTERACTIVE CORPORATION, Montreal (CA)

( * ) Notice: Subject to any disclaimer, the term of this patent is extended or adjusted under 35 U.S.C. 154(b) by 0 days.

(21) Appl. No.: 17/282,315

(22) PCT Filed: Oct. 31, 2019

(86) PCT No.: PCT/CA2019/051548
§ 371 (c)(1),
(2) Date: Apr. 1, 2021

(87) PCT Pub. No.: WO2020/087176
PCT Pub. Date: May 7, 2020

(65) Prior Publication Data
US 2021/0385260 A1    Dec. 9, 2021

Related U.S. Application Data

(60) Provisional application No. 62/754,669, filed on Nov. 2, 2018.

(51) Int. Cl.
*H04L 65/1069* (2022.01)
*A63F 13/35* (2014.01)
(Continued)

(52) U.S. Cl.
CPC .......... *H04L 65/1069* (2013.01); *A63F 13/35* (2014.09); *H04W 4/08* (2013.01); *H04W 8/005* (2013.01); *H04W 56/001* (2013.01)

(58) Field of Classification Search
CPC .... H04L 65/1069; H04W 4/08; H04W 8/005; H04W 56/001
(Continued)

(56) References Cited

U.S. PATENT DOCUMENTS 9,310,883 B2   4/2016  Weising et al.
10,105,601 B1  10/2018 Riton
(Continued)

FOREIGN PATENT DOCUMENTS

WO   WO 2018/236933 A1   12/2018

OTHER PUBLICATIONS

PCT International Search Report and Written Opinion, PCT Application No. PCT/CA2019/051548, dated Feb. 4, 2020, 20 pages.
(Continued)

*Primary Examiner* — Hermon Asres
(74) *Attorney, Agent, or Firm* — Fenwick & West LLP (57) ABSTRACT

Methods and systems of establishing a shared augmented reality session between a first computing device and a second computing device are disclosed. The first and second computing devices perform proximity device discovery using a first data communication technology. The first and second computing devices then perform real-time network communication using a second data communication technology. Once the real-time network communication is established, the first and second computing devices perform coordinate space synchronization using the second data communication technology.

21 Claims, 5 Drawing Sheets

(51) Int. Cl.
*H04W 4/08* (2009.01)
*H04W 8/00* (2009.01)
*H04W 56/00* (2009.01)

(58) Field of Classification Search
USPC ........................................................ 709/227
See application file for complete search history.

(56) References Cited

U.S. PATENT DOCUMENTS

| | | |
|---|---|---|
| 10,737,178 B2 | 8/2020 | Nomura et al. |
| 2014/0240444 A1* | 8/2014 | Szymczyk ............. H04N 7/157 |
| | | 348/14.07 |
| 2014/0273834 A1* | 9/2014 | Merckling ........... H04B 5/0031 |
| | | 455/41.1 |
| 2016/0171777 A1* | 6/2016 | Todeschini ............ G06T 19/006 |
| | | 345/633 |
| 2017/0169617 A1 | 6/2017 | Rodriguez, II |
| 2017/0243403 A1* | 8/2017 | Daniels ................. G06F 3/1454 |
| 2018/0024362 A1 | 1/2018 | Williamson |
| 2018/0335502 A1* | 11/2018 | Lowe .................... G01S 5/0252 |

OTHER PUBLICATIONS

U.S. Appl. No. 17/127,999, filed Dec. 18, 2020 [Application Not Enclosed, Not Yet Published].
PCT Application No. PCT/IB2020/062243, Filed Dec. 18, 2020 [Application Not Enclosed, Not Yet Published].
Taiwan Application No. 109145172, Filed Dec. 18, [Application Not Enclosed, Not Yet Published].

* cited by examiner

SYSTEMS AND METHODS FOR ESTABLISHING A SHARED AUGMENTED REALITY SESSION

CROSS-REFERENCE TO RELATED APPLICATIONS

This application is a National Stage of international PCT Patent Application No. PCT/CA2019/051548 filed on Oct. 31, 2019, which claims the benefit of U.S. Provisional Patent Application Ser. No. 62/754,669, filed on Nov. 2, 2018, which are incorporated by reference herein their entirety.

FIELD

The present application relates in general to computer games and, in particular, to interactive computer games that establish shared Augmented Reality (AR) sessions.

BACKGROUND

Augmented Reality (AR) was develop as a series of technologies aimed at overlaying computer-generated virtual images onto a user's view of the real-world. The widespread use of Global Positioning System (GPS) chips, digital compasses and accelerometers in mobile devices such as smart phones has led to a growth in mobile AR applications. While such mobile devices typically have far less processing power than personal computers, their portability has been a catalyst for the proliferation of mobile AR applications.

Shared AR is the concept of two or more devices (typically mobile devices) running the same AR application in the same physical space experiencing a substantially identical virtual world from different perspectives in real-time. The automated and seamless establishment of shared AR experiences between mobile devices poses a number of technical problems, particularly with respect to the physical detection of devices and the subsequent data exchange requirements for the synchronization of coordinate space.

More specifically, few communication technologies are able to provide both the proximity detection capabilities that allow mobile users to establish shared AR sessions in a seamless (e.g. requires as little user intervention as possible) and flexible manner, and the high levels of data exchange required in real-time connections and the establishment of coordinate space synchronization.

These technical problems are compounded by the need to provide gaming experiences across multiple mobile device platforms, each platform having unique technologies for direct communication between devices, and often being specifically designed to prevent direct communication with devices of other platforms.

Accordingly, there is a need for improved simple and effective methods and systems for establishing proximity-based cross-platform shared AR sessions between mobile devices.

SUMMARY

The present disclosure relates to, amongst other things, methods, systems and mobile device applications configured to provide proximity device discovery and communication using a first data communication technology, real-time networking using a second data communication technology and coordinate space synchronization using real-time networking.

According to a first aspect, there is provided a method of establishing a shared augmented reality session between a first computing device and a second computing device. The method comprises the step of performing proximity device discovery between the first computing device and the second computing device using a first data communication technology. The method further comprises the step of performing real-time network communication between the first computing device and the second computing device using a second data communication technology. The method further comprises the step of performing coordinate space synchronization of the first computing device and the second computing device using the second data communication technology.

According to another aspect, there is provided a non-transitory processor-readable storage medium, having processor-executable instructions stored thereon, which, when executed by a processor, cause a first computing device comprising the processor and a camera to implement an augmented reality application. The augmented reality application is configured to perform proximity device discovery between the first computing device and a second computing device using a first data communication technology. The augmented reality application is further configured to perform real-time network communication between the first computing device and the second computing device using a second data communication technology. The augmented reality application is further configured to perform coordinate space synchronization of the first computing device and the second computing device using the second data communication technology.

According to yet another aspect, there is provided a system for establishing a shared augmented reality session. The system comprises a proximity device discovery module configured to perform proximity device discovery between a first computing device and a second computing device using a first data communication technology. The system also comprises a real-time network communication module configured to establish real-time network communication between the first computing device and the second computing device using a second data communication technology. The system also comprises a coordinate space synchronization module configured to perform coordinate space synchronization of the first computing device and the second computing device using the second communication technology.

BRIEF DESCRIPTION ON THE DRAWINGS

These and other aspects and features of various embodiments will become apparent from the following description with reference to the accompanying drawings, in which.

The aforementioned drawings are provided as non-limiting examples and illustrations of various aspects and features described in the following description.

DESCRIPTION

Figure 1:
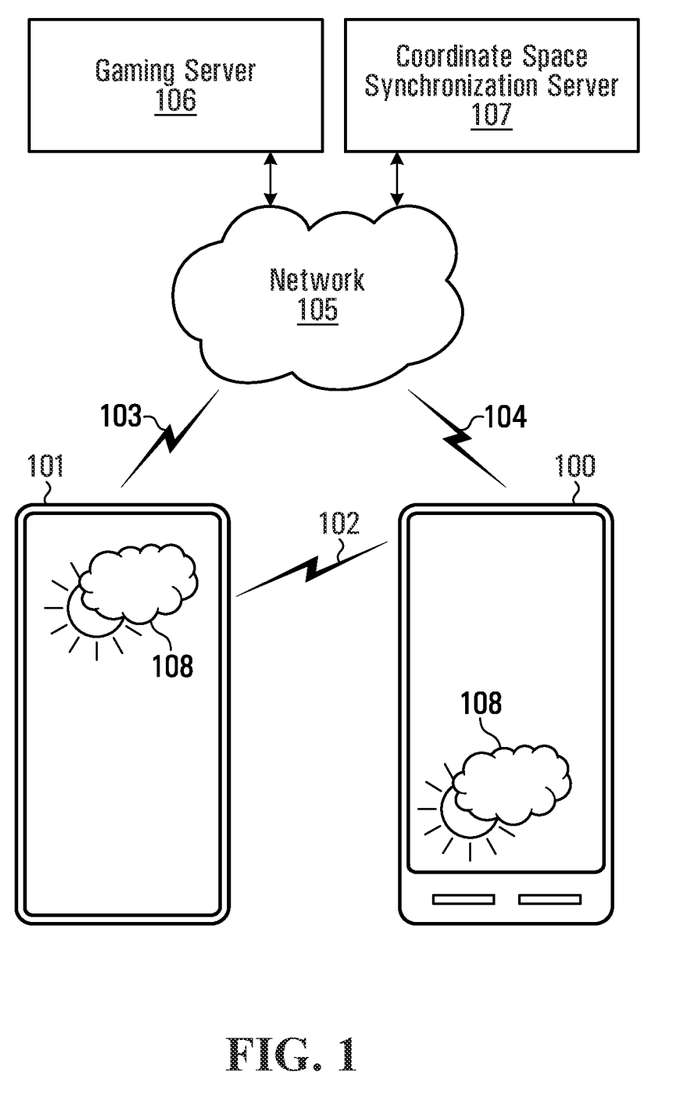
FIG. 1 is a diagram illustrating an embodiment of the system described herein.

With reference to FIG. 1, in order to establish a shared AR experience between a first device 101 of a first platform (e.g. iOS®) and a second device 100 of a second platform (e.g. Android®), the system uses a first wireless communication technology 102 for proximity device discovery and the establishment of real-time network communications, and a second communication technologies 103, 104 for real-time network communications.

As defined herein, a communication technology is a technology that allow two or more devices to enter into data-communication. Communication technologies can implement communication protocols, which define the rules, syntax, semantics, synchronization and error handling of communications, and may be implemented by hardware, software or a combination thereof.

In some embodiments, the first communication technology 102 uses discovery Application Program Interfaces (APIs) that are common to the different platforms. For example, Bluetooth Low Energy (BLE) and Wi-Fi have common discovery APIs for both Android® and iOS® platforms. BLE is a wireless personal area network directed to providing reduced power consumption and cost with a similar range, and was introduced as part of the Bluetooth 4.0 Core Specification. Advantageously, BLE is natively supported by iOS®, Android®, Windows Phone®, BlackBerry®, macOS®, Linux® and Windows 10® operating systems. Moreover, BLE is a radio technology that does not require user intervention to transmit data between devices (e.g. BLE does not require pairing, unlike traditional Bluetooth®), and has a transmission range of between 20 m-30 m (obstructed) and 60 m (line of sight).

Accordingly, in some embodiments, a first communication technology 102 is used for proximity device discovery and for establishment of a real-time network connection between devices 100, 101. For example, in some embodiments, the functionality afforded by the Generic Access Profile (GAP) layer in the BLE technology stack, which functionality includes device discovery, link establishment, link termination, initiation of security features and device configuration, may be used for proximity device discovery and for establishing a real-time network connection.

Typically, in accordance with BLE technology protocols, when a link is established at the GAP layer, data communication (and associated functionality) is subsequently handled at the BLE Generic Attribute Profile (GATT) layer. In order to avoid the disadvantages associated with BLE Generic Attribute Profile (GATT) connections, however, some embodiments of the systems and methods described herein use BLE Advertising and Scanning exclusively for proximity detection and in assisting with the establishment of a real-time network connection (via a second communication technology) between devices 100, 101. As will be appreciated by the skilled reader, other cross-platform communication technologies can be used to ensure device proximity detection, and to assist in establishing a real-time network connection.

As described briefly above, in some embodiments, the AR application service broadcasts as a BLE service. Thus, in such embodiments, devices running the AR application service can scan exclusively for BLE advertisements for the AR application service.

In some embodiments, custom data sent in the BLE advertising packet includes a unique ID used for peer-to-peer resolution by the gaming server 106, as described in more detail below. The gaming server generates this ID upon user account creation, which may, in some embodiments, simply require incrementing an unsigned integer and assigning it to each new user.

Once a scanning device detects an advertisement, the AR application service resolves the unique ID through the gaming server 106 to retrieve the peer information (e.g. username, status, etc.). The AR application service then displays this to the user and notifies them that they may join a shared AR session with the peer, as described above. Should the user accept, or later decide to join their peer (assuming the peer is still within proximity) the AR application service then sends a push notification via the gaming server to the peer requesting their consent to establish a shared AR session.

Once all parties involved have consented to participate in the shared AR session, a real-time network connection is established with the gaming server 106. As defined herein, a real-time network connection is any data-communication connection capable of enabling high frequency, low latency updates between devices. As such, real-time network connections ensure as accurate and smooth an AR experience as possible for users. In some embodiments, the real-time network connection may involve a relay server. In some embodiments, the described system may use the gaming server 106 to host the real-time network session.

As mentioned above, in some embodiments, BLE is used for proximity detection. This method is particularly advantageous because it does not require user intervention to transmit data between devices (e.g. it does not require device pairing).

Figure 4:
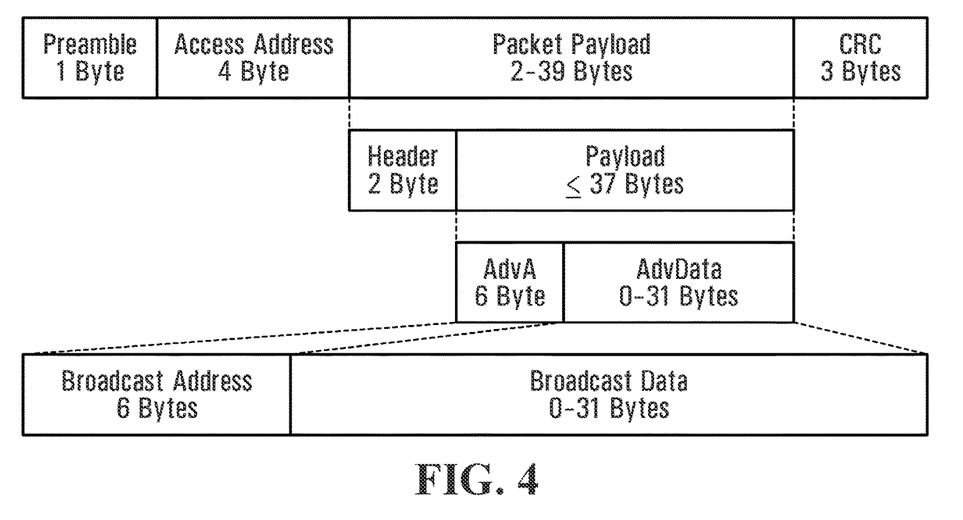
FIG. 4 is a diagram illustrating the general data structure of a Bluetooth Low Energy (BLE) packet.
Figure 5:
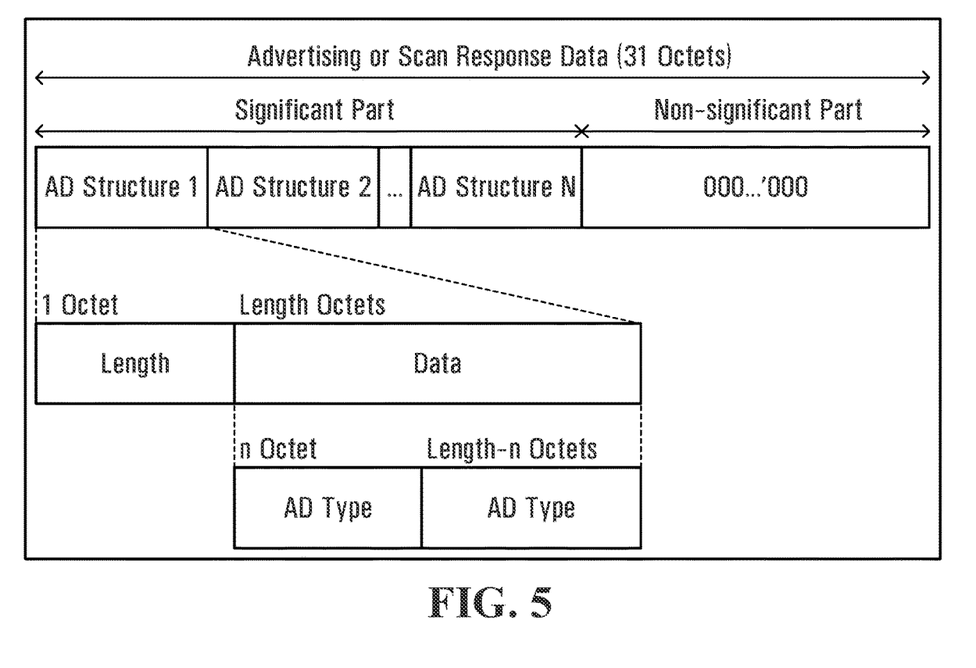
FIG. 5 is a diagram illustrating the general data structure of the Broadcast Data portion of a Bluetooth Low Energy (BLE) packet.
Figure 6:
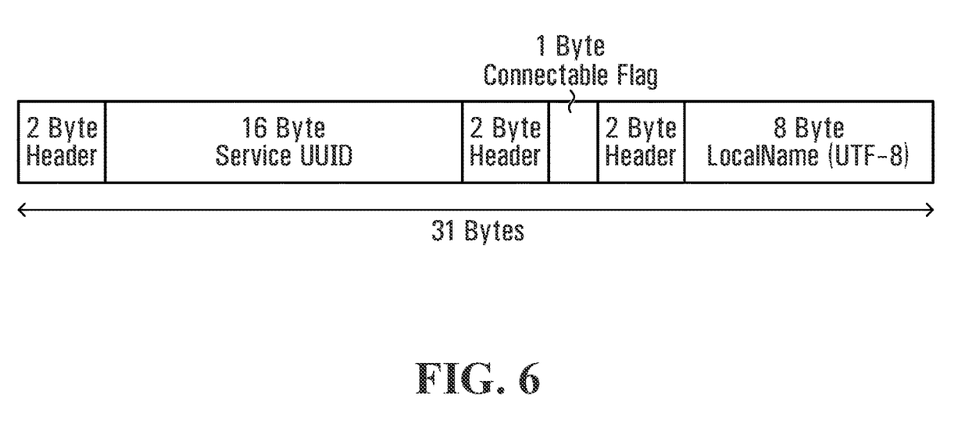
FIG. 6 is a diagram illustrating the data structure of the Broadcast Data portion of a Bluetooth Low Energy (BLE) packet in accordance with a described embodiment.

In some embodiments, BLE Advertising packets are used to transmit data between devices. FIG. 4 represents a diagram of a BLE Advertising packet, which includes 31 bytes for Advertising and Scan Response data. A more detailed structure of the 31 bytes of Advertising and Scan Response data is shown in FIG. 5. FIG. 6 shows a detailed structure of the 31 bytes of Advertising and Scan Response data (i.e. Broadcast data), as used in accordance with an embodiment of the presently disclosed system, which structure includes Service UUID (16 byte UUID+2 byte overhead) having 16, 32, or 128-bit Universally Unique Identifier (UUID) identifying the BLE service. The structure also includes Flags (1 byte flag+2 byte overhead) and LocalName (remaining 8 bytes+2 byte overhead).

Accordingly, by using base64 encoding, it is possible to insert 6 bytes of configurable data into the LocalName field for use by the AR application service. Thus, a unique user identifier and information capable of establishing a real-time network connection may be encoded into 48 bits of the LocalName field.

In some embodiments, the device network IP address and port, together with the unique identifier, are encoded into the 48 bits. In other embodiments, the BLE MAC address (which also serves as a unique identifier that can subsequently be linked to a user's unique identifier by way of the gaming server 106) is encoded into the 48 bits. In yet other embodiments, a user ID that can be generated and resolved by way of a relay server (such as Gamesparks®) can be encoded into the 48 bits. As will be appreciated, other data configuration arrangements may be possible.

Once the real-time network session is established, coordinate space synchronization between device 101 and 100 is sought, as described in detail below.

As will be appreciated, each device running the AR application service has its own virtual representation and understanding of the real world. This includes the world coordinate space, which the AR application service (or an API) creates based on the device position and orientation when the user starts the application. In order to synchronize coordinate space between participating devices, the AR application service can use a third-party coordinate space synchronization system, such as Google Cloud Anchors™.

Thus, coordinate space synchronization can be provided by a cloud-based anchor system such as that provided by Google's ARCore™ Cloud Anchor API service. In order to provide shared AR experiences, such cloud-based systems host and resolve synchronization anchors through real-time network connections. Synchronization anchors are shared reference points in 3D space that allow two or more devices/users to establish coordinate space synchronization, thereby allowing shared AR experiences.

Typically, hosting and resolving synchronization anchors involves having a user create a local anchor in their environment (i.e. surrounding 3D space). During hosting, the user's mobile device, through an API service, uploads 3D feature map data relating to the anchor to the cloud-based system, which returns a unique ID corresponding to that anchor. The AR application running on the mobile device can then distribute the unique ID to other devices/users. Using the unique ID, other AR applications can then recreate the same anchor by having the cloud-based anchor system resolve the anchor through the API service.

In some embodiments, synchronization of the coordinate space between device 101 and 100 may be performed as follows. Device 101 requests an anchor from the coordinate space synchronization server 107 at some position and orientation in the world.

The position and orientation can be obtained by some form of user intervention. In some embodiments, a ray trace against AR planes is made from the user tapping the screen, and the hit location is where the anchor (e.g. a virtual object) is placed. In other embodiments, the anchor can be placed by scanning a real-world object. The request uploads the surrounding point cloud to the coordinate space synchronization server 107 which then generates an anchor based on this information. The coordinate space synchronization server 107 provides device 101 with a unique anchor ID for the anchor.

Then, device 101 sends the unique anchor ID to device 100. Device 100 then scans the area where device 101 placed the anchor and requests that the coordinate space synchronization server 107 resolve the anchor ID. The resolution request uploads the surrounding point cloud to the coordinate space synchronization server 107, which then attempts to resolve an anchor based on this information. Finally, the coordinate space synchronization server 107 provides device 100 with the position and orientation of the anchor, at which point device 100 and device 101 share a synchronized coordinate space.

In some embodiments, the AR application service encourages or prompts the user to map a large section of the anchor placement area before placing the anchor in order to allow for easier resolution of the anchor by the coordinate space synchronization server 107 from varying angles and distances afterwards.

Once an anchor is resolved, the AR application service replicates all position and orientation data in relation to the anchor coordinate space. This can include, for example, "parenting" virtual objects to the anchor or transforming coordinates into the anchor local space before transmitting to peer devices.

Figure 2:
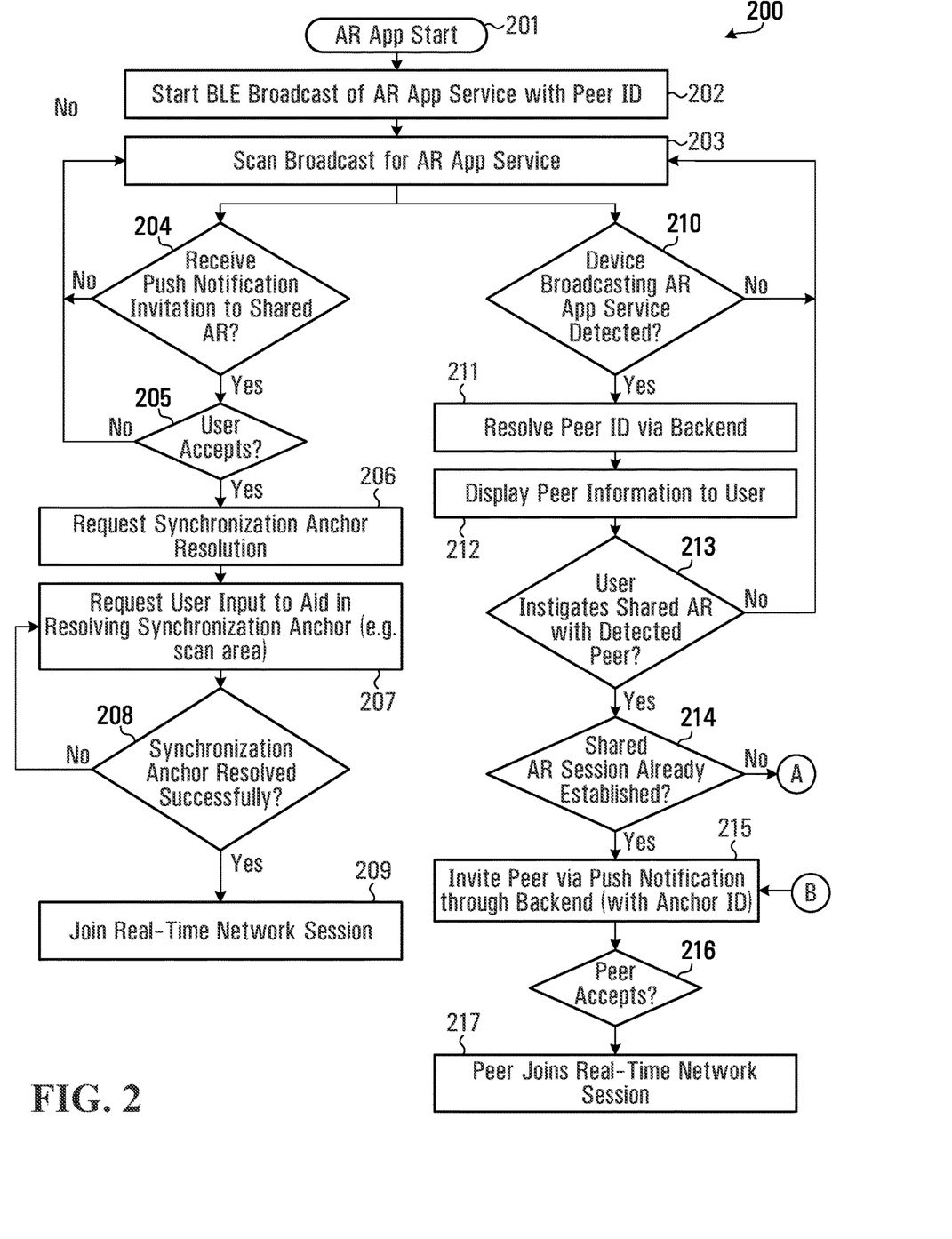
FIG. 2 is a flowchart illustrating steps in a method for establishing a shared AR session in accordance with a described embodiment.

FIG. 2 shows a method 200 of establishing a shared AR real-time network session in accordance with an embodiment. The method comprises the process of accepting an invitation to join a shared AR session (steps 204 to 209) and the process of initiating an invitation to join a shared AR session (steps 210 to 217). It will be appreciated that each of these processes are independent, and therefore need not occur together.

At step 201, an AR application is launched on a mobile device 101. Examples of mobile devices include, but are not limited to, smartphones, tablets, wearable devices (such as Google Glass®) and laptop computers. At step 202, the AR application running on the mobile device 101 starts a BLE Advertising broadcast with a unique peer ID, as described below. Then at step 203, the AR application starts BLE Scanning for broadcast of the AR application service. It will be appreciated by the skilled reader that steps 202 and 203 need not occur sequentially, nor need they occur in any particular order.

With reference to steps 204 to 209 of FIG. 2, the process of accepting an invitation to join a shared AR session is described below. In the example of FIG. 2, another user of a second mobile device 100 may have received and/or otherwise detected the BLE Advertising broadcast sent by mobile device 101, and may have performed a method of instigating a shared AR session as, for example, described in more detail below with reference to steps 210 to 215. In particular, the method described with reference to steps 210 to 215 results in the second mobile device 100 inviting mobile device 101 (via, for example, push notification through gaming server 106) to join a pre-established AR session having a unique ID. In other embodiments, any other type of notification can be used to notify the user of the mobile device 101 of an invitation to join a shared AR session. In some embodiments, the invitation includes the unique ID.

If, at step 204, the mobile device 101 receives a push notification (or other notification) from the gaming server 106 to join a shared AR session, and the user of the mobile device 101 accepts the invitation at step 205, the method proceeds to steps 206 to 208, which aim to have the coordinate space synchronization server 107 resolve the synchronization anchor relating to the unique ID. If, on the other hand, no invitation is received (step 204), or indeed the invitation is refused by the user of mobile device 101 (step 205), then the AR application of mobile device 101 continues to perform BLE Scanning for broadcast of the AR application service.

At step 206, once the user of mobile device 101 has accepted the invitation, the AR application sends a request to the coordinate space synchronization server 107 to resolve the anchor, by way of the API service. At step 207, the AR application and/or the coordinate space synchronization server 107 may request that the user of the mobile device 101 provide input in order to aid in the resolution of the synchronization anchor, and perform some degree of mapping in order to generate the required 3D feature map data. Such mapping can, for example, include moving the mobile device around the anchor point in 3D space in order to capture 3D feature map data (e.g. the anchor's relative position with respect to other objects in the 3D space surrounding the anchor, assessed from multiple angles). In some embodiments, the AR application can generate instructions and/or other visual indicators through the User Interface (UI) in order to assist the user in capturing 3D feature map data. In some embodiments in which the disclosed system and method is at least partially implemented using the ARCore™ Cloud Anchor API, step 206 can be implemented using the resolve CloudAnchor(cloudAnchorId) resolve request.

If the synchronization anchor is resolved successfully at step 208, the mobile device 101 joins the real-time network session, by way of communication technology 103. In some embodiments, communication technology 103 allows mobile device 101 to communicate over the Internet, such as, WiFi or broadband cellular network technologies (e.g. 4G, 5G, etc.).

As will be appreciated, in some embodiments, communication technologies 103 and 104 can comprise a plurality of interoperable communication technologies. For example, mobile device 101 could be connected to a broadband cellular network access point and mobile device 100 could be connected to a WiFi access point, the broadband cellular network access point and the WiFi access point being interconnected by various elements of networking infrastructure.

If, on the other hand, the coordinate space synchronization server 107 is unable to successfully resolve the anchor at step 208, the user may again be asked to provide further input at step 207 to aid in resolving the synchronization anchor. Alternatively (not shown), the method may be ended and the user may be informed that the coordinate space synchronization server 107 was unable to resolve the synchronization anchor.

With reference to steps 210 to 217 of FIG. 2, and FIG. 3, the process of inviting a peer to join a real-time network session will now be described. In the present example, mobile device 100 may broadcasting an AR application service by way of BLE Advertising, as described in more detail above.

Then, at step 210, mobile device 100 broadcasting the AR application service is detected by mobile device 101. In some embodiments, the BLE Advertising packet will include Peer ID information allowing mobile device 101 to identify mobile device 100 (or the user of mobile device 100) by way of peer information, as described in more detail below. In some embodiments, the BLE Advertising packet will include other information (such as a unique identifier) which will allow mobile device 101 to send a request to the gaming server 106 to resolve the Peer ID of mobile device 100 (step 211).

At step 212, peer information related to the Peer ID is displayed to the user of mobile device 101. As will be appreciated, peer information includes, but is not limited to, any information allowing a the user of mobile device 101 to identify mobile device 100 and/or the user of mobile device 100, and/or indeed an Internet Identity (IID), such as a pseudonym used online by gamers, or other identities used in internet forums, online chats, social media, etc.

At step 213, the user of mobile device 101 can choose to instigate a shared AR session with the detected peer associated with the Peer ID, or continue scanning for broadcasts of the AR application service. If the user of mobile device 101 instigates a shared AR session with the detected peer at step 213, a determination is made at step 214, by gaming server 106, for example, as to whether a shared AR session has already been established by, for example, mobile device 100.

If a shared AR session has already been established, the mobile device 100 and/or the gaming server 106 invites the peer (the user of mobile device 101), via push notification through the backend, for example, to join the established AR session. In some embodiments, the invitation also includes an anchor ID associated with the synchronization anchor established for the shared AR session. If the peer (i.e. the user of mobile device 101) then accepts the invitation at step 216, the peer joins the real-time network session. If, at step 214, it is determined that a shared AR session has not already been established, then a shared AR session can be established by the user of mobile device 100 (or the user of mobile device 101) as described, for example, with reference to FIG. 3.

Figure 3:
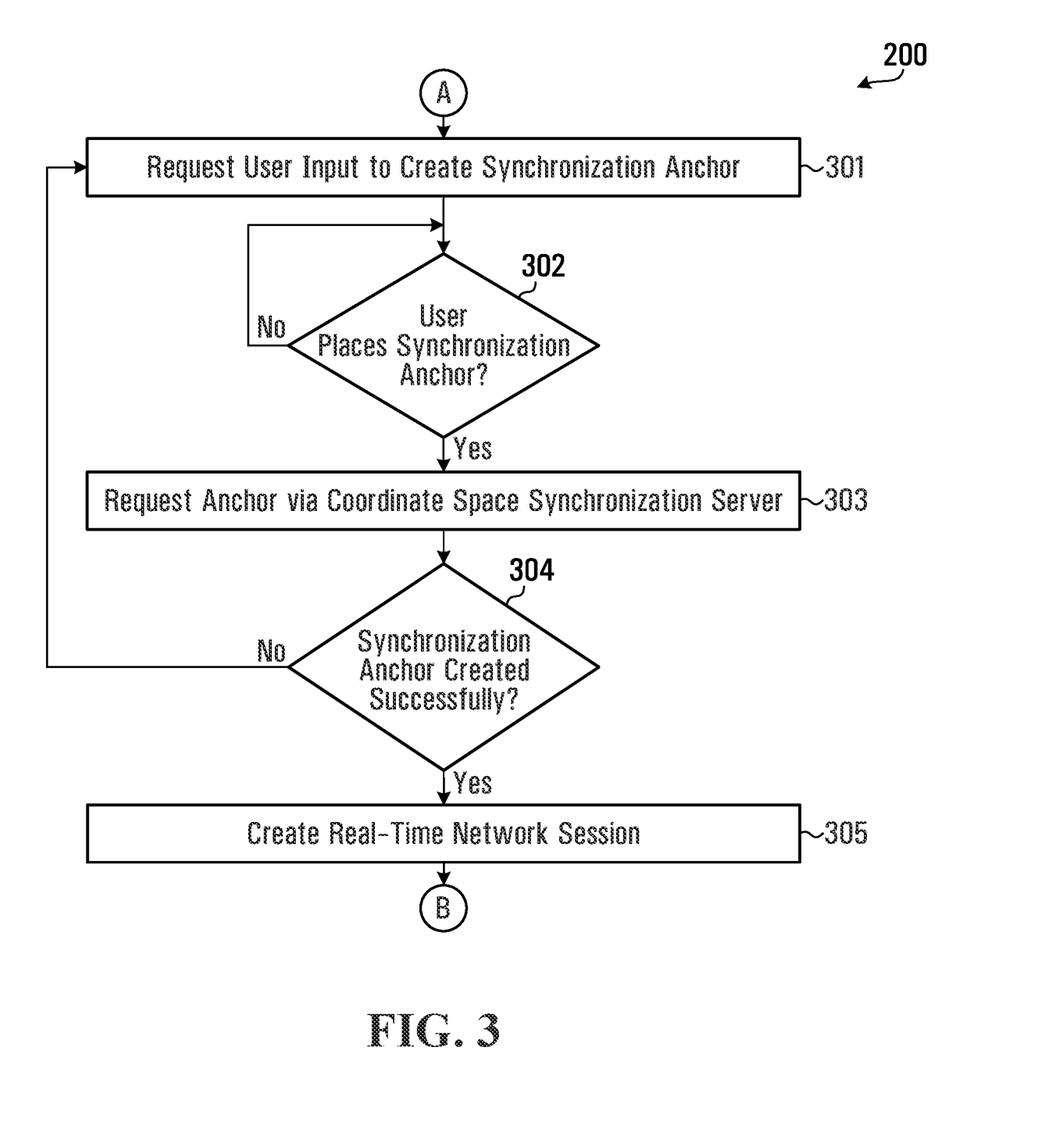
FIG. 3 is a flowchart illustrating steps in a method for establishing a real-time network session in accordance with a described embodiment.

FIG. 3 shows an embodiment of a method 300 for establishing a shared AR session. While the process described below relates to the establishment of a synchronization anchor 108 by the user of mobile device 101, it will be appreciated that the same process can be used by mobile device 100 to create a synchronization anchor.

At step 301, a user creates a synchronization anchor 108 using the AR application running on mobile device 100. Creation of the anchor typically involves a user placing a virtual object/anchor at a point in three dimensional space (step 302), as seen from the camera of the mobile device. Then, the user obtains a 3D feature map of the environment in and around the point from different viewing angles and positions in a certain period of time prior to the request being submitted using the API service. In some embodiments, the process of generating the 3D feature map can be initiated by the user. In other embodiments, the process of generating a 3D feature map can be initiated automatically. In some embodiments, in order to reduce the amount of time required for a user to collect 3D feature map data by moving the camera around a particular point in 3D space, the process can be initiated automatically, and without user notification. For example, in some embodiments, the AR application service may begin mapping an area in order to collect data for anchor resolution as soon as it receives an invitation at step 204 or as soon as the peer ID is resolved via the backend at step 211. In these embodiments, the anchor ID can be exchanged, and the anchor resolution can be achieved prior to the user being asked whether they wish to accept an invitation to a shared AR session at steps 205 or 216.

Then, after the user places the synchronization anchor at step 302, the AR application service requests an anchor via the coordinate space synchronization server 107 at step 303. In some embodiments in which the disclosed systems and methods are at least partially implemented using the ARCore™ Cloud Anchor API, step 303 can be implemented using the hostCloudAnchor(anchor) hosting request.

If it is determine at step 304 that the synchronization anchor has not been created successfully at step 304, then the AR application requests further user input to create a synchronization anchor at step 301. In some embodiments, the request for further input can include a request to reposition the anchor in another location. In some embodiments, the request for further input can include a request to obtain further 3D feature map data of the environment in and around the point from different viewing angles and positions.

Once it is determined at step 304 that the synchronization anchor has been created successfully, a shared AR session is created by the gaming server 106 at step 305.

Once a shared AR session has been established, the mobile device 101 and/or the gaming server 106 invites the peer (the user of mobile device 100), via push notification through the backend (e.g. gaming server 106), for example, to join the established AR session. In some embodiments, the invitation also includes an anchor ID associated with the synchronization anchor established for the shared AR session. If the peer (i.e. the user of mobile device 100) then accepts the invitation at step 216, the peer joins the real-time network session.

Those skilled in the art will appreciate that the above described systems and methods allow for simple cross-platform establishment of shared AR sessions.

The description and drawings merely illustrate the principles of the invention. It will thus be appreciated that those skilled in the art will be able to devise various arrangements that, although not explicitly described or shown herein, embody the principles of the invention and are included within its scope, as defined in the appended claims.

Furthermore, all examples recited herein are principally intended to aid the reader in understanding the principles of the invention and are to be construed as being without limitation to such specifically recited examples and conditions. For example, the present disclosure describes embodiments of the invention with reference to specific communication technologies. It will however be appreciated by the skilled reader that the present invention can also advantageously be used with other communication technologies that provide the same or similar capabilities.

Moreover, all statements herein reciting principles, aspects, and embodiments of the invention, as well as specific examples thereof, are intended to encompass equivalents thereof. For example, the functions of the various elements shown in the figures, including any functional blocks labelled as "server", "network" or "application program interface" may be provided through the use of dedicated hardware as well as hardware capable of executing software in association with appropriate software.

Furthermore, while the aforementioned description refers to mobile devices, a person of skill in the art would readily recognize that steps of various above-described methods can be performed by any number of computing devices, such as video cameras, digital cameras, infrared cameras, desktop computers, laptop computers, tablets, smartphones, smart watches or other wearables. Herein, some embodiments are also intended to cover program storage devices, e.g., digital data storage media, which are, machine or computer readable and encode machine-executable or computer-executable programs of instructions, wherein said instructions perform some or all of the steps of the above-described methods. The embodiments are also intended to cover computers programmed to perform said steps of the above-described methods.

Any feature of any embodiment discussed herein may be combined with any feature of any other embodiment discussed herein in some examples of implementation. Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

The invention claimed is:

1. A method of establishing a shared augmented reality session between a first computing device and a second computing device, the method comprising the steps of:
    performing proximity device discovery between the first computing device and the second computing device using a first data communication technology;
    performing real-time network communication between the first computing device and the second computing device using a second data communication technology; and
    performing coordinate space synchronization of the first computing device and the second computing device using the second data communication technology;
    wherein the first data communication technology is Bluetooth Low Energy (BLE); and
    wherein proximity device discovery is performed using BLE Advertising packets and Scan Response packets.

2. The method of claim 1, further comprising the step of establishing real-time network communication partially using the first data communication technology.

3. The method of claim 2, wherein the Advertising packets include at least one packet comprising peer identification information identifying the first computing device.

4. The method of claim 3, wherein the peer identification information comprises network Internet Protocol (IP) address information and networking port information relating to the first computing device and a unique identifier relating to a user of the first computing device.

5. The method of claim 2, wherein the real-time network communication is established through a remote gaming server.

6. The method of claim 1, wherein the coordinate space synchronization is performed using a cloud-based anchor system.

7. The method of claim 6, wherein the coordinate space synchronization is performed using ARCore™ Cloud Anchor Application Program Interface (API) service.

8. A non-transitory processor-readable storage medium, having processor-executable instructions stored thereon, which, when executed by a processor, cause a first computing device comprising the processor and a camera to implement an augmented reality application configured to:
    perform proximity device discovery between the first computing device and a second computing device using a first data communication technology;
    perform real-time network communication between the first computing device and the second computing device using a second data communication technology; and
    perform coordinate space synchronization between of the first computing device and the second computing device using the second data communication technology;
    wherein the first data communication technology is Bluetooth Low Energy (BLE); and
    wherein the augmented reality application is further configured to perform proximity device discovery using BLE Advertising packets and Scan Response packets.

9. The non-transitory processor-readable storage medium of claim 8, wherein the augmented reality application is further configured to establish real-time network communication partially using the first data communication technology.

10. The non-transitory processor-readable storage medium of claim 9, wherein the Advertising packets include at least one packet comprising peer identification information identifying the first computing device.

11. The non-transitory processor-readable storage medium of claim 10, wherein the peer identification information comprises network Internet Protocol (IP) address and networking port information relating to the first computing device and a unique identifier relating to a user of the first computing device.

12. The non-transitory processor-readable storage medium of claim 9, wherein the augmented reality application is further configured to establish the real-time network communication at least in part by connecting to a remote gaming server.

13. The non-transitory processor-readable storage medium of claim 9, wherein the augmented reality application is further configured to perform the coordinate space synchronization using a cloud-based anchor system.

14. The non-transitory processor-readable storage medium of claim 13, wherein the augmented reality application is further configured to perform coordinate space synchronization using ARCore™ Cloud Anchor Application Program Interface (API) service.

15. A system for establishing a shared augmented reality session between a first computing device and a second computing device, the system comprising:
   a proximity device discovery module configured to perform proximity device discovery between the first computing device and the second computing device using a first data communication technology;
   a real-time network communication module configured to establish real-time network communication between the first computing device and a second computing device using a second data communication technology; and
   a coordinate space synchronization module configured to perform coordinate space synchronization of the first computing device and the second computing device using the second communication technology;
   wherein the first data communication technology is Bluetooth Low Energy (BLE); and
   wherein proximity device discovery is performed by the proximity device discovery module using BLE Advertising packets and Scan Response packets.

16. The system of claim 15, wherein the proximity device discovery module is further configured to communicate, using the first data communication technology, information required by the real-time network communication module to establish real-time network communication using the second data communication technology.

17. The system of claim 16, wherein the Advertising packets include at least one packet comprising peer identification information identifying the first computing device.

18. The system of claim 17, wherein the peer identification information comprises network Internet Protocol (IP) address information and networking port information relating to the first computing device and a unique identifier relating toa user of the first computing device.

19. The system of claim 15, wherein the real-time network communication module is part of a remote gaming server.

20. The system of claim 15, wherein the coordinate space synchronization module is part of a cloud-based anchor system.

21. The system of claim 20, wherein the coordinate space synchronization module comprises ARCore™ Cloud Anchor Application Program Interface (API) service.

* * * * *

UNITED STATES PATENT AND TRADEMARK OFFICE
CERTIFICATE OF CORRECTION

| | |
|---|---|
| PATENT NO. | : 11,388,205 B2 |
| APPLICATION NO. | : 17/282315 |
| DATED | : July 12, 2022 |
| INVENTOR(S) | : Anthony Reddan and Renaud Bedard |

It is certified that error appears in the above-identified patent and that said Letters Patent is hereby corrected as shown below:

In the Claims

Column 12, Line 19, Claim 18, delete "relating toa" and insert -- relating to a --.

Signed and Sealed this
Sixteenth Day of May, 2023

*Katherine Kelly Vidal*

Katherine Kelly Vidal
*Director of the United States Patent and Trademark Office*